May 21, 1940.  M. A. BROCKETT  2,201,152
INGREDIENT CABINET
Filed Dec. 29, 1938  2 Sheets-Sheet 1
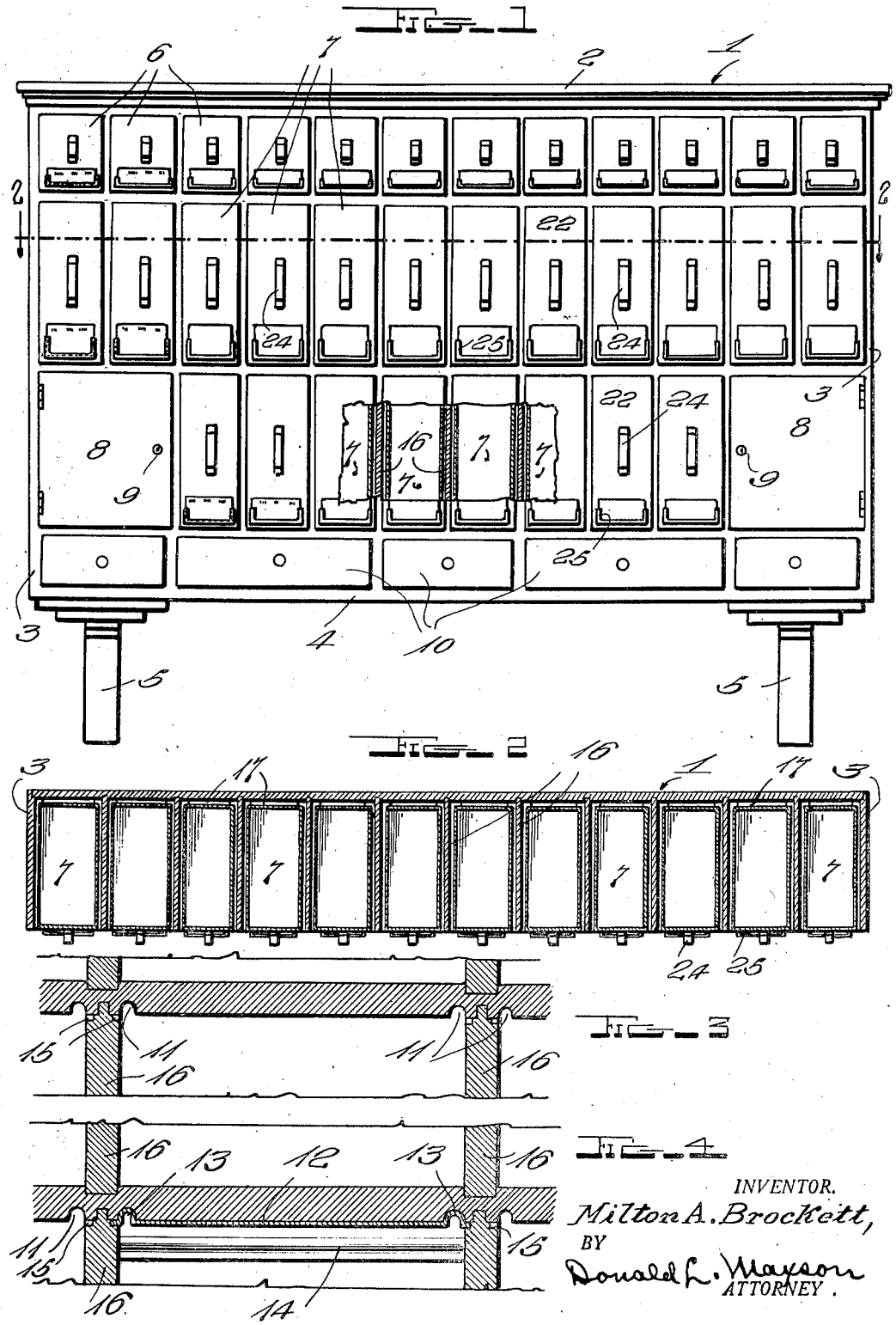
INVENTOR.
Milton A. Brockett,
BY
Donald L. Mayson
ATTORNEY.

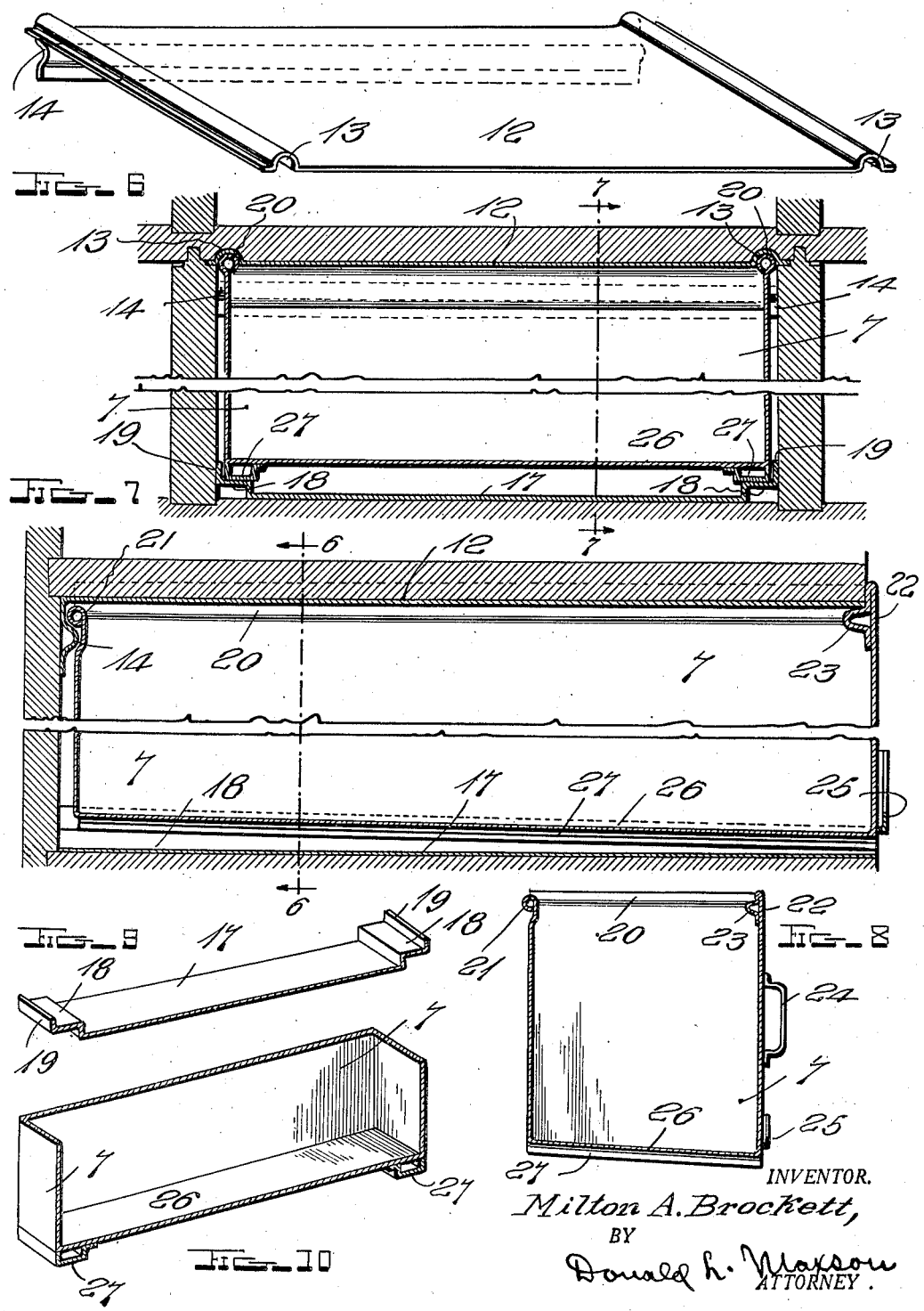

Patented May 21, 1940

2,201,152

UNITED STATES PATENT OFFICE 2,201,152

INGREDIENT CABINET

Milton A. Brockett, Oshkosh, Wis.

Application December 29, 1938, Serial No. 248,313

3 Claims. (Cl. 45—7)

My invention relates to improvements in ingredient cabinets and containers, and more particularly to a composite cabinet having a number of various sizes of compartments provided with replaceable metal tops and bottoms which are adapted to cooperate with to receive and seal metal containers when in position within the compartments, whereby the various ingredients in the containers will be stored in a sanitary and efficient manner free from dust, dirt and contamination.

An object of my invention is to provide a highly efficient form of cabinet and container construction, whereby the several containers which will be received within the compartments of the cabinet will be frictionally held in the compartments, and will be sealed about the four sides of their tops by my improved formation of rabbeted and rolled edge construction, thereby providing a substantially dust and dirt proof container and cabinet, and a construction which will prevent evaporation of the ingredients stored in the containers in the cabinet.

Another object of my invention is to provide an improved form of cabinet adapted to receive a number of open topped containers, which will cooperate with removable metal tops and sloping bottoms received in the cabinet, whereby when the containers are received within the cabinet, they will be securely wedged within the compartments, and will be completely sealed.

A still further object of my invention is to provide an improved ingredient cabinet having a number of dust proof containers removably positioned within the same, which will be highly efficient in operation and relatively inexpensive to manufacture and produce.

Other objects will appear as the description proceeds.

In the accompanying drawings which form a part of my application,

Figure 1 is a front elevation of my improved ingredient cabinet, showing a portion thereof in section;

Figure 2 is a sectional view taken on the line 2—2 of Figure 1;

Figure 3 is a sectional view of a portion of one of the cabinet compartments before the insertion of the top plate;

Figure 4 is a sectional view of a portion of one of the cabinet compartments after the insertion of the top plate;

Figure 5 is a perspective view of one of the top plates;

Figure 6 is a transverse sectional view of one of the cabinet compartments with the top and bottom plates and a container in position therein;

Figure 7 is a sectional view taken on the line 7—7 of Figure 6;

Figure 8 is a sectional view through one of my containers;

Figure 9 is a fragmentary view of a portion of a bottom plate, and

Figure 10 is a fragmentary view of a portion of the bottom of one of my containers showing the oppositely disposed bearing ledges adapted to slide on the inclined ramps on the opposite sides of the bottom plates.

Like characters of reference are used throughout the following specification and the accompanying drawings to designate corresponding parts.

In carrying out my invention, I provide a cabinet 1 formed with a top 2, sides 3, and a bottom 4, and with supporting brackets 5 at the opposite ends of the bottom 4, whereby my improved ingredient cabinet may be supported in any desired position, preferably adjacent to the work tables in a kitchen, where all the stored ingredients may be easily reached, and the containers in which the ingredients are kept may be replaced immediately after use.

The cabinet 1 is further formed with a plurality of transversely arranged small compartments for the reception of small containers 6, and with a plurality of transversely arranged larger compartments for the reception of larger containers 7, also with large compartments having hinged doors 8 provided with locks 9, and with the drawers 10 arranged transversely of and at the bottom of the cabinet.

The cabinet is formed from a good grade of wood, with the sides, tops and bottoms of the various compartments rabbeted, mortised, and pegged-glued throughout as clearly illustrated in the several views of the drawings. By referring to Figures 3, 4 and 6, it will be seen the tops of the compartments are rabbeted out along their opposite sides, as at 11, and are adapted to receive the metal top plates 12, as shown in Figure 5. The top plates 12 are formed with parallel extending grooved tracks 13 adjacent their opposite edges, and with the downwardly and inwardly turned or rolled beads 14 at their inner ends. The side edges of the top plates 12 are received within the kerfs 15 formed in the compartment sides 16, thus providing a tight and dust-proof closure.

The bottom plates 17 are adapted to be positioned in each compartment of the cabinet, and to contact the floors thereof, and are provided at their opposite sides with the inclined ramps 18 extending from front to rear of the plates, and are further provided with the side flanges 19 adapted to contact the adjacent sides of the compartments. It will be understood that each compartment is provided with a removable metal top and bottom plate, which will cooperate with a removable metal open topped container for the ingredients, which construction will be now described.

The containers are formed of a good metal, which will be wear resistant, as well as the top and bottom plates, and will be formed with opposite sides formed with rolled top edges 20 adapted to be received and guided in the grooved tracks 13 in the top plates 12, and with a back also formed with a rolled top 21, adapted to interlock above and cooperate with the inwardly turned bead 14 at the rear end of the said top plate 12. The front of the container 22 will be bent backwardly and downwardly to form a locking bead 23 which will impinge and frictionally engage the under surface of the front edge of the said top plate 12 when the container is received within the same. A suitable handle 24 will be welded to, or otherwise attached to the container front, and a flanged label holder 25 will also be mounted on the front of the container adjacent its lower or bottom portion. The bottom of the container is designated by the numeral 26, and slopes upwardly from the front to the rear, as shown in Figure 8 of the drawings, and is formed with the oppositely disposed hollow guide rails 27 formed integrally therewith, which are adapted to seat on and be guided by the ramps 18 on the bottom plates 17, whereby when the containers are pushed into the compartments, the same will be frictionally engaged by both the top and bottom plates, and the cooperating grooves and beads will cause the complete sealing of the containers so that they will be dust-proof and will prevent evaporation of the ingredients stored therein. Inasmuch as the containers, and the contacting portions of the top and bottom plates are made from metal, there will be no appreciable wear to the several parts, and hence the cabinet will last for a great length of time.

Many minor changes in detail of construction may be resorted to without departure from the spirit of the invention.

Having thus described my invention what I claim as new and desire to secure by Letters Patent of the United States is:

1. A device of the character described including a compartment adapted to receive a metal container having a rearwardly inclined bottom and being open at its top, metallic top and bottom guide plates supported in said compartment, guide flanges formed at the opposite sides and at the rear of said top plate, locking flanges formed along the upper sides and rear edge of said container adapted to interlock with said guide flanges in the top plate when the container is fully housed in the compartment, and cooperating frictional wedging means on said bottom plate and on the bottom of the container for effecting the sealing of the container by said top plate as it is pushed into said compartment.

2. A device of the character described including a compartment and an open topped container normally received within the compartment, metal top and bottom plates in said compartment, sealing grooves formed in the top plate, rearwardly extending ramps formed at the opposite sides of said bottom plate, cooperating guide rails formed along the opposite sides of the bottom of the container adapted to slide on said ramps and to frictionally wedge the container within the compartment as it is pushed into place, and to simultaneously seal the open top of the container in contact with the sealing grooves in the top plate.

3. A device of the character described including a compartment and a container fitting therein, the under surface of the top of said compartment being grooved, a metal top plate having grooves corresponding to the grooves in the compartment top, means for securing the metal top plate in the compartment, a metal bottom plate fitted on the floor of the compartment having rearwardly and upwardly extending ramps along its opposite sides, said container having a rearwardly extending inclined bottom and being open at its top, said container being further provided with sealing beads along the top of its opposite sides and rear wall corresponding to the grooves in the top plate, whereby when said container is pushed into the compartment, the metal top will seal the container to exclude air or any foreign matter therefrom.

MILTON A. BROCKETT.